United States Patent Office 3,241,455
Patented Mar. 22, 1966

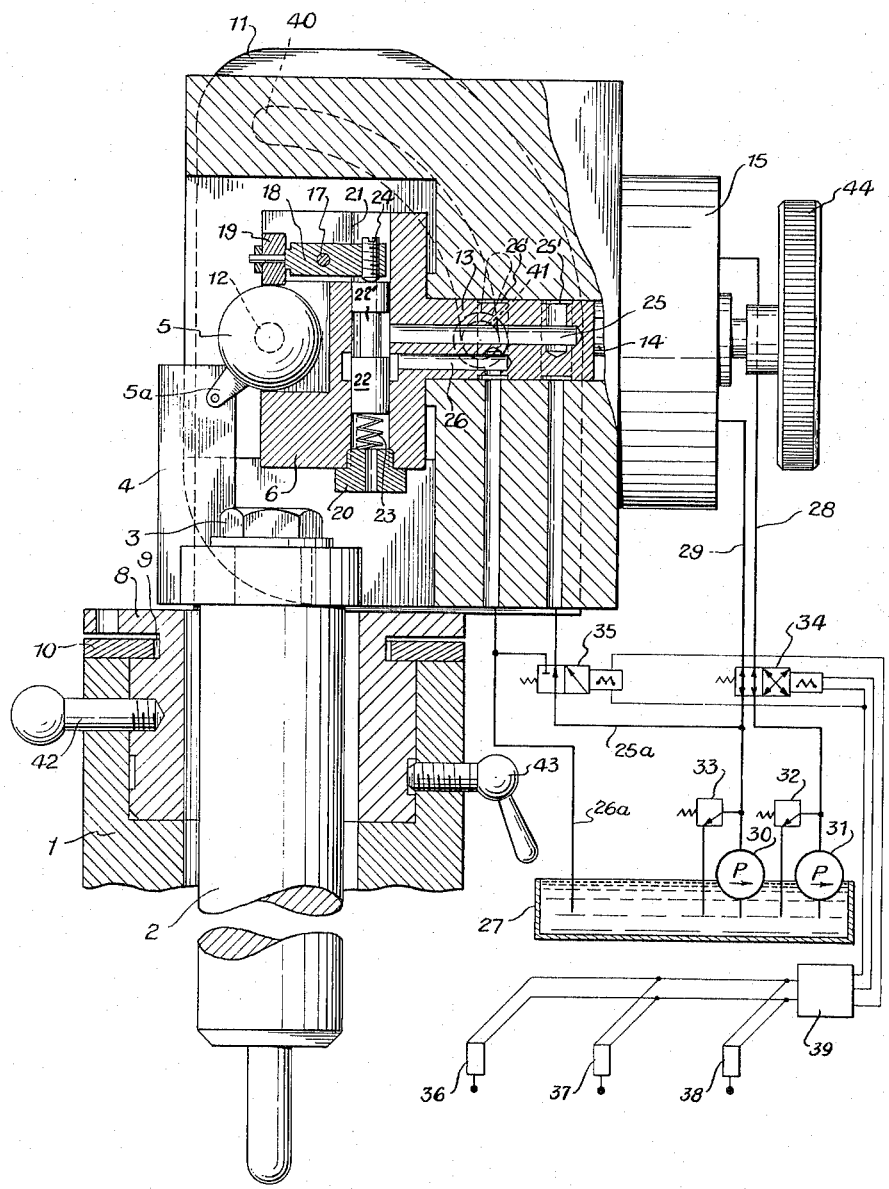
INVENTOR
Paul Kohl

3,241,455
TRACING MECHANISM FOR DUPLICATING MILLING MACHINES
Paul Kohl, Langen, near Frankfurt, Germany, assignor to Nassovia Werkzeugmaschinenfabrik G.m.b.H., Frankfurt am Main, Germany
Filed June 24, 1965, Ser. No. 473,271
Claims priority, application Germany, June 24, 1964, N 25,164
9 Claims. (Cl. 90—62)

This invention relates to a key operated and controlled duplicating machine tool and, in particular, is directed to a tracing device for a duplicating milling machine which is operated in the manner of an advance controlled machine or the pattern, i.e. the tracer pin controls the machine along the master in advance against the milling cutter(s). This results in that the idle position of the machine lasts as long as the tracer is in zero position. This zero position means the conditions prevailing when the control units connected to the tracer rod are occupying a position which eliminates every possibility for a feed movement in any direction.

A well-known duplicating machine of this type is equipped with an electromagnetically operated advance control mechanism composed of a tracer carrying a ball on its upper end and with a measuring (testing) head block engaging the ball. The measuring head, through the ball, is displaceable by longitudinal movement of the tracer in any axis extending through the center of the ball. The purpose of this device is to hold the tracer in continuous contact with the master and to control the direction of movement of the measuring head, and thus the movement of the measuring head continuously and automatically as regards the contact tangent between the tracer and the master. In this way, the forward movement of the machine tool starts always parallel with the longitudinal movement of the tracer. The measuring head and the ball control an electric switch which actuates the advance control mechanism, and the measuring head swings in a constant range as determined by the corresponding position of the component parts. The advance control mechanism therefore is subject to a relatively high wear and tear.

Another well-known duplicating milling machine is controlled by a hydraulically operating advance control mechanism composed of three pins mounted on the upper end of the tracer and directed at each of the X, Y and Z axes. Each pin drives a hydraulic valve either to the right or left as predetermined, and the piston in the valve, together with the pins, forms a hydraulic switch. This apparatus is limited as to the direction of milling lines possible. Thus this machine only permits operations longitudinally, transversely and vertically. For each change in the direction of lines, it is necessary to remove the hydraulic valve from one pin and place it into effective engagement with another one which is a clumsy and time-consuming operation. Also, this exchange requires a high degree of accuracy in the positioning of the pins on the tracer which necessitates great care and considerable adjustment. Another disadvantage is in that the line contact between the pins and the valves can be broken by a pendulum movement of the tracer which results in a disagreeable change in the forward movement of the machine. During contour tracing, such a constant tilting movement is present because the tracer and the pins are constantly pushed outwardly in a pendulum movement.

The objects of this invention are to avoid the above disadvantages and to produce a tracing device which avoids the constantly oscillating movement of the measuring head and maintains a constantly even forward movement and uninterrupted operation in any line direction together with optimum accuracy in duplicating the master. In the tracing mechanism for this invention for duplicating milling machines, the advance control mechanism is influenced by parallel or angular outward movement of the tracer in any selected direction for starting the forward movement of the machine tool in the same direction as the outward movement of the tracer. This is achieved by using a hydraulically driven measuring head which embraces a ball on top of the tracer. The measuring head rotates either to the right or left in the sense of the advance control program and is equipped with a hydraulic valve which, under the effect of the guiding force, maintains the tracer in constant contact with the master so that outward movement of the tracer initiates the drive of the measuring head. Preferably the measuring head is supported in a housing and is equipped with a hydraulically driven slide valve mounted transversely of the longitudinal axis of the measuring head. A lever engages the ball and one end of the slide valve and a spring urges the slide valve into engagement with the lever. Movement of the valve by the lever translates the distance and direction of the tracer into the respective commands for stopping, direction of rotation and degrees of rotation of the hydraulically driven measuring head.

This invention combines in a simple way the advantages of the electromagnet mechanism which swings continuously around the longitudinal axis of the tracer with the advantages of a hydraulically operating mechanism which must be changed step by step. This invention thus produces a device which can be operated automatically or controlled by hand for forming two-dimensional lines or contour duplicating milling, or for three-dimensional contour milling while maintaining optimum accuracy in duplicating the master.

According to the invention, the hydraulic valve in the measuring head is composed of a single piston valve spool and the tension of the spring is adjustable. This is a simple and inexpensive structure and the amount of the pre-guidance force can be controlled by adjusting the spring.

A further feature of this invention is a hydraulic motor for driving the measuring head by means of hydraulic pressure pipes having different pressures and interconnected by a four-way hydraulic switch valve which is actuated by electric limit and reversing switches mounted on the machine sled, and also a two-way magnetic valve operated by the same switches which is connected to one of the two pressure pipes and the valve in the measuring head in such a manner that a pressure differential in the pipes is neutralized when the tracer is in contact with a smooth and even surface on the master. On outward movement of the tracer, a differential pressure is produced in the pipe for driving the measuring head. The two pipes are connected to two pumps and to the four-way magnetic valve and from which one pipe goes through a two-way magnetic valve and to the measuring head. The limit switches are electrically connected to the magnetic valves by relay switches. The valves and switches thus make an automatic guidance of the measuring head and thus of the milling lines possible.

A further feature of this invention is that a measuring head is movable in any direction around the center of the ball and can be locked in any position. For example, the measuring head can be locked on the X axis, that is the horizontal plane, and tilted at an angle extending to any point between the Y and Z axes. This universal mounting makes it possible to mill diagonal lines as well as longitudinal, transverse and vertical lines and, in fact, any line having a direction to a point lying between the X, Y and Z axes. The housing is supported between a pair of brackets extending parallel to the longitudinal axis of the tracer and movable around this axis. The housing is rotatable around the center of the ball and thus has a universal movement thereabout.

The means by which the objects of the invention are obtained are described more fully with reference to the accompanying drawing which is a vertical cross-sectional view through the sensor head with the pipe lines and electrical lines shown schematically.

A housing 1 is adapted to be fixed to a duplicating milling machine (not shown) and surrounds the tracer 2 which is supported by conventional means to be freely movable in all directions. A bolt 3 holds arm 4 on the upper end of tracer 2 and carries the ball 5 by means of a stud 5a.

Measuring head block 6 is carried in a housing 7 which is rotatably mounted on the housing 1 by means of a support member. This member is composed of a bearing 8 having a groove 9 and secured to housing 1 by means of a split ring 10 which extends into groove 9. A pair of flanges 11 is secured to bearing 8. Housing 7 is carried between these two bearing frames so that it is movable about the center 12 of the ball. Bolts extend through curved slots in flanges 11 and engage housing 7 to hold the housing in any given position.

Measuring head block 6 is on the end of measuring head shaft 13 which is joined to the drive shaft 14 of hydraulic motor 15 which is secured to housing 7. Head block 6 has a cavity 16 in which lies the ball 5 and is of greater diameter than the ball. A pivot pin 17 secures lever 18 in a groove in block 6 and a roller 19 on the outer end of the lever engages ball 5 to hold the ball on the surface of the cavity diametrically opposite the roller. An adjustable end dog 20 closes one end of a cylinder 21 extending transversely of the longitudinal axis of the measuring head shaft 13 and contains a single piston valve spool 22 having a groove 22'. A spring 23 between the end dog 20 and one end of piston 22 urges the piston toward set screw 24 in lever 18. End dog 20 can be turned to adjust the force on roller 19 and thus the extent of the advance control force transmitted to ball 5 through lever 18. Set screw 24 serves at the same time as a means for the adjustment of the angle size formed from the contact tangent of the tracer on the pattern and the direction of the advance control force. Hydraulic channels 25 and 26 communicate with cylinder 21 at one end and at the other end through bores 25' and 26' in shaft 13 communicate with pipes leading to a source of liquid in tank 27. Two other pipe lines 28 and 29 extend from the pumps 30 and 31 to pump liquid from the tank 27. Pipes 28 and 29 are connected to pressure limit valves 32 and 33, respectively, and both pipes are connected to a four-way magnetic valve 34 and to hydraulic motor 15. Hydraulic channel 25 however is connected through a pipe 25a to a two-way magnetic valve 35 and then to pipe 29 at a point lying between valve 34 and the pressure limiting valve 33. The return pipe line 26a coming from channel 26 is also connected to the two-way magnetic valve 35 and through which it is connectable to pipe 29 when it is not desired to return the fluid to tank 27. Inasmuch as the advance control mechanism operates with a diffferential pressure between the pipe lines, the pressure limiting valve 33 is adjusted so that a higher pressure of, for example, 6 atmospheres is prevailing in pipe 29 than in pipe 28 in which pressure limit valve 32 is set at a lower pressure of, for example, 4 atmospheres. Therefore, when the tracer 2 is not in contact with the pattern, piston 22 is at its uppermost position closing channel 26, and no liquid flows from channel 25 into line 26 so that valves 32 and 33 set the liquid pressure in pipes 28 and 29.

Electric limit or stop switches 36, 37 and 38 are adapted to be mounted on the operating sled of the machine tool and limit the extent of movement of the sled in all three directions the sled can move. These are conventional limit switches which, together with corresponding switching cams, are adjustable to set the length of the path of the sled. The switches 36, 37 and 38 are connected to the magnetic valves 34 and 35 through an impulse relay 39.

The operation of the mechanism is as follows. It is assumed that longitudinally extending lines are to be milled which correspond to the position of the measuring head as shown in the drawing in which the housing 7 has been indexed to the position set by bolts 41 and 42. The longitudinal line adjustment is then controlled by conventional means not herein explained in detail. It is further assumed that tracer 2 is not in contact with the pattern. Piston 22 in this case is at its upper end position in which spring 23 forces it against set screw 24 so that the roller 19 holds the ball 5 in constant contact with the measuring head block 6. Channel 26 is thus closed by the piston 22 and the valves 34 and 35 are positioned so that a pressure difference prevails in channel 25 and pipe 29 as opposed to pipe 28. The liquid in pipe 28 is at a pressure then to drive motor 15 clockwise and thus rotates shaft 13 constantly to turn the measuring head in the same direction of rotation as the motor.

Now when the tracer is moved toward the master and contacts, for example, a horizontal surface on the master, it relatively moves upward with regard to housing 7 and lifts through arm 4 and ball 5 the roller 19 so that piston 22 is pushed downwardly by lever 18 and thus slightly opens channel 26. Liquid then flows from channel 25 into channel 26 so that the pressure in channel 25 and pipe 29 is reduced by the liquid flowing through return pipe 26a into tank 27, and this reduction of pressure can continue until it reaches the pressure of, for example, 4 atmospheres in pipe 28. At this point, the pressures in channel 25 and pipes 28 and 29 are equal. At this moment, the position of the components is set by the adjustment of screw 24 of the direction of the advance control force of the contact tangent between the master and the tracer 2, and the tracer is thus moved forwardly a certain amount by the advance control force and this forward or outward movement influences the power (not described in detail) which causes a movement of the machine sled in a backward direction. Tracer and tool therefore move from the front to the back in the horizontal plane determined by the master.

Three typical possible movements of the tracer are now given:
(1) The tracer can move downwardly because of an indentation in the master;
(2) The tracer can therefore be also moved upwardly because of a rise in the master; and
(3) The tracer can also, at the end of a line, be reversed in direction by reason of the limit switch provided on the machine sled.

Each of these possibilities is now described in detail.

It is assumed that the tracer moves downwardly because of an indentation in the pattern. The ball 5 lowers and piston 22 moves upwardly to follow this lowering movement by the pressure of spring 23 as lever 18 causes roller 19 to follow the movement of the ball. Channel 26 is closed and the pressure in channel 25 and pipe 29 goes up until it reaches its adjusted pressure of 6 atmospheres. At the same time, this pressure build up via the pressure in pipe 28 starts motor 15 to rotate clockwise and as when the tracer is not in contact with the master starts to drive the measuring head for such time as the contact component or direction of the advance control force has adapted itself to the altered course of contour of the master. When this moment has been reached, then the width of the opening between the ball and the head block 6 which corresponds to the angle of the contact component to the contact tangent between the master and tracer has been closed, whereby piston 22 moves slightly downwardly and opens channel 26 so that again the pressure is reduced in channel 25 and pipe 29 until it reaches the same pressure in pipe 28. The rotation of the motor 15 and shaft 13 is stopped thereby and the forward movement as determined by the changed course of contour on the master is initiated again by means provided at the tracer which initiates the forward movements. Tracer 2 and the tool thus move in the downward direction of the indentation in the master. As soon as tracer 2 encounters an obstacle in its path, as when it again reaches a horizontal surface on the master, it is moved upwardly. This then, in turn, raises the ball 5, pushes piston 22 downwardly which further opens channel 26 and thus, in turn, effects a reduction in the pressure in channel 25 and pipe 29 so as to again produce a pressure differential in pipe 28 as compared to channel 26 and pipe 29. This pressure difference now is directed in the opposite sense, that is, a lower pressure exists in channel 25 and pipe 29 than pipe 28 so that motor 15 is rotated counterclockwise for such a period of time that ball 5, by means of spring 23, is again returned to its position in the measuring head block 6 as determined by the direction of the contact components. Piston 22 returns to a position with a very small opening into channel 26 so that the pressure in channel 25 and pipe 29 rises again until it reaches the pressure existing in pipe 28, that is, 4 atmospheres. Equal pressure then prevails in the pipes and the motor 15 stops.

In the second typical possibility of operation, it is assumed that tracer 2 is lifted by an elevation in the master. Identical control procedures result in this case but in a reverse manner with an outward movement of the tracer starting the altered direction of the tracer up to the following movement of the control mechanism. This means therefore, with a change in contour in the master, a tracer movement takes place which induces counterclockwise rotation of the measuring head, only to be followed, during another change in the direction of movement of the tracer, as by reaching the horizontal plane, by a clockwise rotation of the measuring head.

The third typical possibility relates to reversing the line direction induced by the advance control mechanism. Limit switches for setting the direction and length of movement are mounted on the machine sleds and these switches are actuated by cams mounted on the immovable portion of the machine sled. The switches are electrically connected to the magnetic valves 34 and 35. In the drawing, switch 36 is mounted on the cross sled and serves to limit and reverse the direction of the sled transversely. The tracer is in this case indexed as to its movability for longitudinal movement. The limit switch is joined through impulse relay 39 to the magnet of the four-way valve 34 and by way of a time relay to the magnet of the two-way valve 35. It is assumed that the tracer is tracing the master in a horizontal plane and transversely from the front to the back. Ball 5 takes a position within the measuring head block 6 which moves piston 22 to hold channel 26 slightly open so that equal pressure exists in channel 25 and pipes 28 and 29. Motor 15 is at a standstill. As soon as the machine sled with limit switch 36 hits the backward switching cam, switch 36 energizes impulse switch 39 and the time relay. This in turn energizes the magnet of fourway magnetic valve 34 so that the connections to the pipes 28 and 29 are interchanged and this remains up to the next activation of the limit switch. As equal pressure is now in all pipe lines, a change in the pressure in the pipe lines alone will not result in any change of direction of the advance control mechanism. To accomplish a change in direction needs a difference in pressure between lines 28 and 29 and/or 25. Such difference in pressure is obtained with the aid of the two-way magnetic valve 35 which is energized simultaneously with the valve 34 by way of the time relay from switch 36; the connection to channel 25 is closed and lines 28 and channel 26 blocked off, it being remembered that switch 36 has reversed the connection of pipes 28 and 29. This then reduces the pressure in pipe 28 and motor 15 is driven in a clockwise direction. The time relay in this instance is adjusted so that the exchange of connections in valve 35 is maintained for such a length of time that the measuring head has turned approximately 120°. When this angle has been reached, then the direction of the advance control force with the contact tangent between the tracer and the master assumes an angle of about 30° which corresponds to the position of the components initially chosen and adjusted by set screw 24 with the difference that the advance control direction is now reversed and moved from back to front, and the valve 35 is switched by the time relay into its original position whereupon pipe 28 and channel 25 are again connected with one another and have equal pressure therein. Motor 15 is stopped. The same procedure is repeated when limit switch 36 is actuated by the forward switching cam on the machine sled, however in a reverse manner. Now the magnet in valve 34 is not energized so that the pipes are not interchanged and the pipe connections are as shown in the drawing. Two-way valve 35 operates as described above. This produces a pressure in pipe 29 which is lower than that in pipe 28 so that motor 15 is driven counterclockwise. Limit switches 37 and 28 are used for controlling the sled movements in the other two operating directions and in effect corresponds to that for switch 36. During the duplicating of longitudinal and vertical lines, the same change in control is obtained by the limit switches 37 and/or 38.

Thus far the description has been only for the three typical possibilities of the movement of the tracer which influences the advance control mechanism. It is to be understood that these possibilities can be varied from one another in many different ways which are to a large extent determined by the shape of the master. The manner of the operation of the advance control mechanism as explained above was given from the position of the machine elements as shown in the drawing which corresponds to duplicate line milling in a transverse direction. However, with this invention, it is possible to mill lines extending in any direction in space. To accomplish this, it is only necessary to turn housing 7 on its support member 8 around ball center 12 or to turn support member 8 in its bearing in housing 1 around the longitudinal axis of tracer 2. To execute milling lines in a longitudinal direction, bolt 42 is unlocked and support member 8 carrying housing 7 rotated 90° which is counterclockwise as seen in the drawing. The new position thus indexed is again locked with the bolt 42 which fits into a corresponding bore displaced 90° in support member 8.

When the line direction is to extend in a direction deviating from the longitudinal or transverse direction, then first bolt 42 is unlocked and the support member 8 together with housing 7 turned to the desired line direction which always corresponds to the axis extending through ball center 12 perpendicular to the plane of the drawing and which line direction can be indicated by scale markings on support member 8 and housing 1. This adjusted position can be fixed by means of locking bolt 43. A templet (not shown) can be arranged above the master to guide the tracer 2 in the chosen line direction to ensure that the tracer not indexed for this position maintains this line direction rather than being movable in any direction.

For duplicating contour milling, bolt 41 is unlocked so that housing 7 is turned 90° to its vertical position and then bolt 41 locked again. One of the flanges 11 shoring the housing support is provided with a curved slot 40 extending over an angle of 90° through which the bolt 41 extends into the housing. Thus housing 7 can be fixed by bolt 41 in any desired inclination within the 90° angle. In this vertical position of the housing, the position of support member 8 is not important. The limit switches 36, 37 and 38 are not used for circumferential milling over 360°. However, if the surface to be duplicated is less than 360°, then the reverse in direction can be accomplished at the end of each contour line by the transverse limit switch 36, or the longitudinal end switch 37, or by both together.

It is possible to lock housing 7 in any angular position between the horizontal and vertical, which means that, as in three-dimensional contour milling, the angularity of the contour of the master can be, with regard to the horizontal plane, extended in range rather than being limited to a certain master size because of the disruptive affect of the friction at the points where the tracer comes into contact with the master.

If it is desired to control the duplicating milling by hand, then pumps 31 and 32 are cut off and the change in the direction of the advance control force in dependence upon the contact tangent between the master and tracer 2 is accomplished by a handwheel 44 joined to shaft 14 of motor 15. Tracer 2 is then guided semi-automatically along the contour of the master by rotating this handwheel.

Aside from this semi-automatic duplicating process, it is also possible to guide the tracer 2 by hand along the contour of the master by switching the advance control mechanism out of operation.

Having now described the means by which the objects of this invention are obtained,

I claim:

1. A measuring head for a duplicating machine tool comprising a tracer adapted to follow a master or pattern, a ball carried by said tracer, a measuring head shaft rotatably engaging said ball, and hydraulic valve means actuatable by movement of said ball for controlling the rotation of said shaft in response to movements of said tracer following a master or pattern.

2. A measuring head as in claim 1, further comprising a measuring head housing rotatably supporting said measuring head shaft, and said hydraulic means including a slide valve mounted transversely through said shaft, lever means secured to said shaft for moving said slide valve in response to movement of said ball by said tracer, and spring means engaging said slide valve for urging said slide valve against said lever means.

3. A measuring head as in claim 2, said slide valve comprising a single piston valve, and means for adjusting the tension of said spring means.

4. A measuring head as in claim 3, said hydraulic means further comprising two hydraulic pressure pipe lines extending from said piston valve through said measuring head shaft, pump means connected to said pipe lines to supply different hydraulic pressures to said lines, a hydraulic four-way magnetic valve interconnecting said pipe lines and adapted to be energized by reversing limit switches on a machine tool sled, and hydraulic two-way magnetic valve means interconnecting said pipe lines and adapted to be energized by said limit switches and by said slide valve for neutralizing the pressures in the pipe lines when the tracer follows an even contour, and for otherwise producing a differential pressure in said pipe lines upon movement of the slide valve by said ball to cause rotation of said measuring head shaft.

5. A measuring head as in claim 4, further comprising one of said pipe lines being interconnected between both said four-way valve and said two-way valve.

6. A measuring head as in claim 5, further comprising relay switch means electrically joining said four-way valve and said two-way valve and being adapted to be energized by said limit switches.

7. A measuring head as in claim 2, further comprising supporting means mounting said housing for universal movement of said housing around the center of said ball.

8. A measuring head as in claim 7, further comprising means for securing said housing in a position in a horizontal plane and in an inclined position with respect to a vertical plane.

9. A measuring head as in claim 8, said means for securing said housing comprising a spaced bearing frame, curved grooves in said bearing frame, and locking bolt means extending through said grooves and into said housing for adjustably holding said housing between said bearing frame.

References Cited by the Examiner

UNITED STATES PATENTS 2,796,806   6/1957   Schlapp _____ 90—62

WILLIAM W. DYER, Jr., *Primary Examiner.*

G. A. DOST, *Assistant Examiner.*